Feb. 1, 1966     R. H. FROST     3,232,014
WINDOW WELL COVER
Filed Dec. 26, 1961     3 Sheets-Sheet 1

INVENTOR.
RICHARD H. FROST
BY
ATTORNEYS

Feb. 1, 1966  R. H. FROST  3,232,014
WINDOW WELL COVER
Filed Dec. 26, 1961  3 Sheets-Sheet 2

INVENTOR.
RICHARD H. FROST
BY
ATTORNEYS

Feb. 1, 1966 R. H. FROST 3,232,014
WINDOW WELL COVER
Filed Dec. 26, 1961 3 Sheets-Sheet 3

INVENTOR.
RICHARD H. FROST
BY
ATTORNEYS

United States Patent Office 3,232,014
Patented Feb. 1, 1966

1

3,232,014
WINDOW WELL COVER
Richard H. Frost, 4900 Larkspur, Bow Mar, Colo.
Filed Dec. 26, 1961, Ser. No. 161,996
5 Claims. (Cl. 52—80)

This invention relates to window well covers and, more particularly to a unit of the class described that effectively protects the well against the entry of dirt and other debris yet admits both air and light.

Residences and several other types of buildings utilize basements that contain windows in the foundation walls, all or a substantial portion of which lie beneath ground level. In such instances, wells are provided in the ground at each window to admit both light and air and these wells are customarily shored with a generally semi-circular corrugated steel reinforcing wall structure that is imbedded in the ground and attached to the building wall along both of its free vertical margins. These open-topped wells, however, create a number of problems for the homeowner that are difficult to solve both economically and satisfactorily.

For example, serious injuries can occur to anyone that is unfortunate enough to fall into one of the wells and this becomes an especially acute problem in neighborhoods where small children are likely to be playing. Dead leaves, dirt, waste paper and other similar refuse have a tendency to collect in window wells rendering them most unsightly especially when viewed from inside the house through the basement window. They are also a favorite nesting place for poisonous spiders such as the Black Widow and other vermin and rodents. All in all, window wells, while necessary to introduce air and light into subsurface rooms, become a source of extreme annoyance to the homeowner.

The prior art attempts to solve these problems have, to say the least, only been partially successful. It is, of course, no solution to cover the well with an opaque lid of some type as the very purpose of the well, namely, the introduction of light and air through the basement windows is completely destroyed. The most widely used window well covers comprise some sort of grating which will support a person's weight thus preventing accidents while, at the same time, letting in air and most of the available light. These gratings, however, accomplish very little insofar as preventing the accumulation of debris in the well and, in fact, render them somewhat more difficult to clean. Certain types that include widely-spaced bars and the like are still dangerous as children can get their feet wedged therebetween.

Some type of translucent or transparent cover for the well would seem to provide the best solution insofar as preventing the accumulation of debris and admitting light and this is, in fact, the case although the commercially-available structures of this type still have much to be desired and have created certain new problems not ordinarily found with the grate-type. The obvious one is, of course, that they effectively block off the passage of fresh air into the basement or similar structure. Secondly, they are quite expensive especially when fabricated from material of sufficient thickness to support the weight of an adult. Probably the most significant problem, however, is providing the cover with suitable fasteners by which it can be attached to the upper edge of the corru-

2 gated reinforcing wall when the fact is appreciated that these shells vary quite widely in shape, thickness, overall dimension and are most likely bent out of shape or otherwise deformed by the dirt pressing thereagainst during the backfilling operation.

It is, therefore, the principal object of the present invention to provide a novel and improved window well cover.

A second objective is the provision of a unit of the class described that is translucent and will effectively protect the well against the entry of unwanted debris.

Another object of the invention is to provide a window well cover that is more or less dome-shaped to shed water and additionally includes reinforcing webs that make it strong enough to easily support a two hundred pound man even though constructed of thin-walled fiberglass.

Still another object is the provision of means located on the underside of the cover which support same in spaced relation above the upper margin of the reinforcing shell thus enabling fresh air to enter the well along with the subsurface room communicating therewith.

An additional objective is the provision of a unique adjustable spring-clip-type fastener that will accommodate various types, shapes and styles of window well shells even though they have been bent out of shape or otherwise deformed.

Further objects of the invention are to provide a translucent plastic window well cover that is strong, light-weight, rugged, inexpensive, versatile, easy to install, waterproof, rustproof, simple to clean, decorative in appearance and one that is adaptable for use with various types, styles, shapes and sizes of window well shells.

Other objects will be in part apparent and in part pointed out specifically hereinafter in connection with the description of the drawings that follows, and in which.

Figure 1:
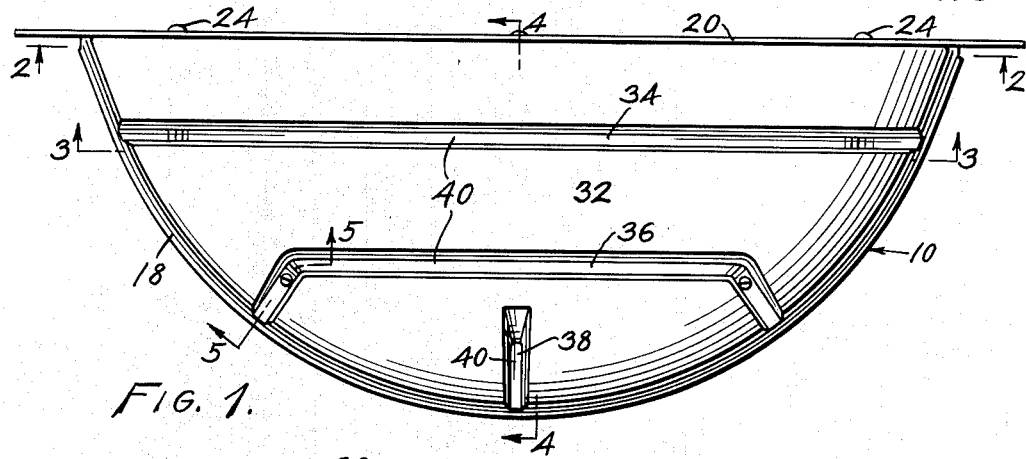
FIGURE 1 is a top plan view of the window well cover of the present invention and the shield that can be used therewith to cover the portion of a basement window projecting above ground level.
Figure 8:
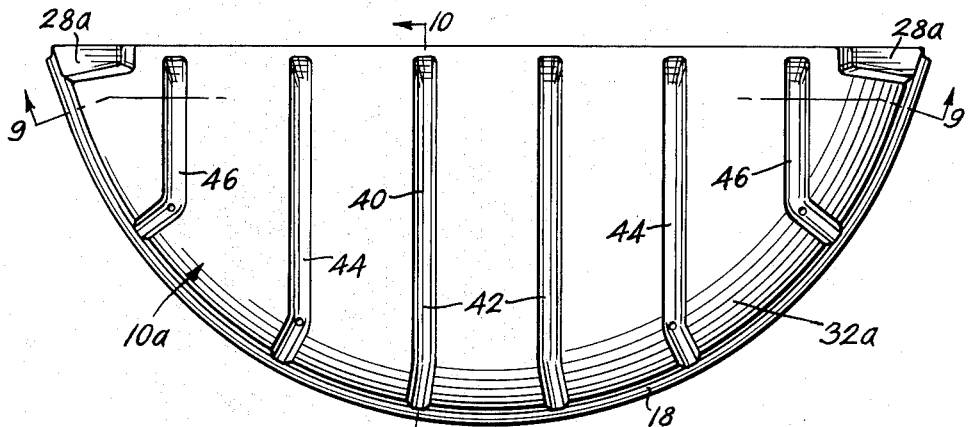
FIGURE 8 is a top plan view similar to FIGURE 1 showing an alternative reinforcing rib placement.
Figure 12:
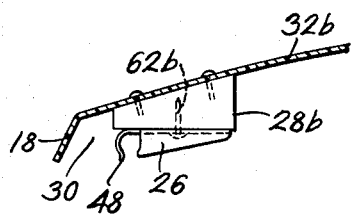
Figure 11:
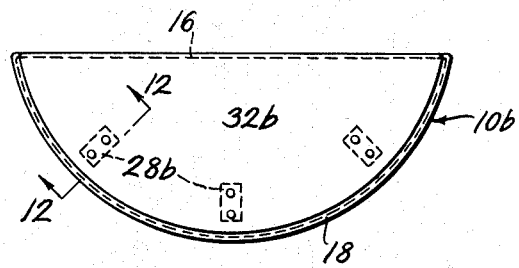

FIGURE 11 is a top plan view to a reduced scale similar to FIGURES 1 and 8 showing a further modified construction in which the reinforcing ribs have been eliminated; and, FIGURE 12 is a fragmentary section to a slightly enlarged scale taken along line 12—12 of FIGURE 11 showing the blocks that are fastened to the underside of the cover as a support therefor and for the clips in the absence of the ribs.

Figure 2:
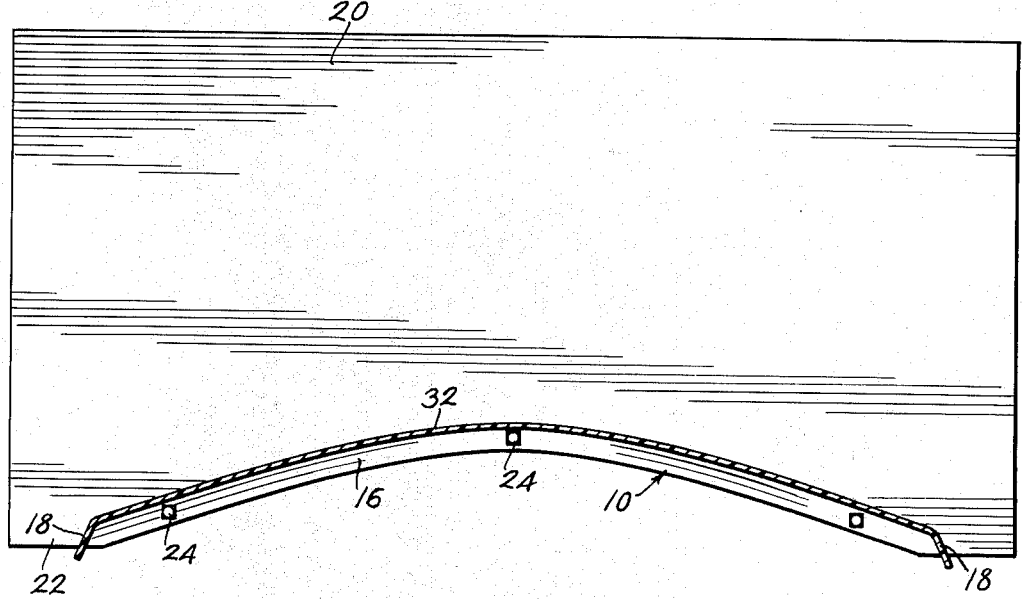
FIGURE 2 is a section taken along line 2—2 of FIGURE 1.
Figure 3:
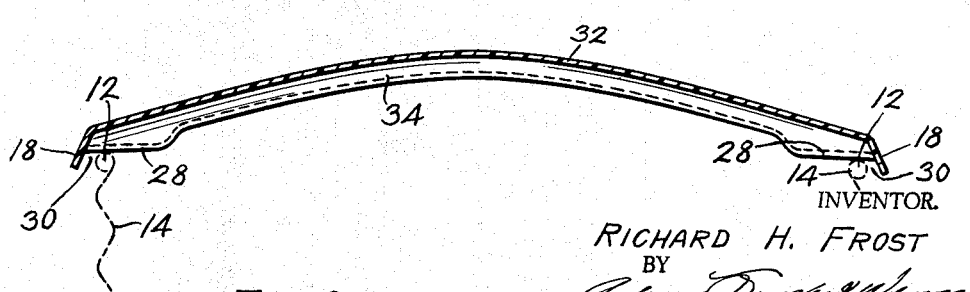
FIGURE 3 is a section taken along line 3—3 of FIGURE 1 showing the reinforcing rib construction and the feet by which the cover is supported in spaced relation above the corrugated shell, the latter having been indicated in dotted lines.

Referring now to the drawings for a detailed description of the present invention and, in particular, to FIGURES 1, 2 and 3 for this purpose, the window well cover that has been indicated in a general way by reference numeral 10 will be seen to have a more or less dome-shaped or convex configuration as viewed from above and to be approximately semi-circular conforming with the tubular edge 12 of the most widely used type of corrugated metal window well shell 14 (FIGURE 3). Most of these shells do not encompass a full semi-circle as indicated in FIGURE 1; but rather, comprise circular arcs of perhaps 160° in angular extent. Others have a straight front wall and spaced parallel side walls interconnecting the front wall by means of rounded corners of large radius. The cover construction illustrated herein is that which is designed to accommodate the most widely used shell design and it is perfectly obvious that the cover will be modified where necessary to fit other commercially-available styles.

In accordance with the teaching of the instant invention, the cover 10 is preferably fabricated from a moldable high-strength plastic such as, for example, translucent fiberglass of the type that is sprayed into a suitable mold. As such, the unit is quite inexpensive to produce, yet, is waterproof, rustproof, rugged and extremely serviceable. The fiberglass is available in a variety of different colors depending upon the desires of the particular user. The unit is translucent and not transparent thus admitting substantial light from out-of-doors while maintaining more privacy than it is possible to achieve with even frosted glass in the window sashes. It is even possible to create certain decorative effects in the cover such as, for example, a speckled appearance by incorporating foreign particles in the plastic from which they are fabricated.

Most basement windows are not flush with the exterior wall surface and some project several inches or more above the ground level. The cover 10 includes as a part thereof a downturned flange 16 along the rear edge thereof that ordinarly rests against the exterior building wall surface forming a seal therewith effective to prevent the passage of debris into the well along with most of the water from rains and snows which drains toward the circular edge defined by downturned skirt 18. In instances, however, where the top edge of the recessed window lies above ground level, the well cannot be sealed off properly to prevent the passage of foreign material between the window and rear edge of the cover unless a shield such as that indicated at 20 is used in combination with the cover.

The shield 20 is preferably formed from the same material as the cover and has its lower edge 22 curved to conform with the downturned flange of the cover to which it is bolted or otherwise attached as indicated at 24. As illustrated, the shield is generally rectangular although the shape of the top and side edges is immaterial as long as the area thereof is adequate to cover that portion of the window opening in the foundation wall that projects above ground level. Ordinarily, of course, the shield would merely project beyond the edge of the window opening onto the bordering exterior wall surface a few inches at most.

The cover and associated shield are attached to one another and, if desired, can be attached to the building wall although this is unnecessary and the preferred method of use is to maintain such contact as is required by means of the interconnection between the shell 14 and cover 10. If, therefore, the resulting assembly needs to be removed for any reason, it can be lifted off the shell in an instant as a contiguous unit, the clip fasteners 26 (FIGURES 5, 6 and 7) immediately releasing same. The same is true, of course, of the cover 10 used alone.

Before leaving the description of the shield, it will be well to point out that it is valuable in preventing dirt piled on top of the cover as radiation fall-out protection from entering the window well through recessed window openings projecting above ground level. The cover itself which bears the load is easily capable of supporting the twelve inch thick dirt layer recommended for this purpose.

One of the principal features of the window well cover of the present invention is the construction that permits fresh air to circulate into the well and communicating basement room while effectively preventing water, debris and all but very small rodents from entering the well. The foregoing is accomplishing by making the radius of the cover somewhat larger than the radius of the shield 14 with which it is to be used so that skirt 18 lies spaced outwardly from the edge 12 of the shell where it is supported on angularly spaced feet 28 to define an air space 30 through which air can enter. Note that these feet support the convex top 32 of the cover 10 in spaced relation above the edge 12 of shell 14 as seen most clearly in FIGURES 3 and 5. The skirt 18, on the other hand, extends slightly below the upper margin of the shell in the preferred embodiment illustrated herein thus preventing foreign matter from entering the well through space 30.

For reasons of economy of manufacture, the least wall thickness that is capable of providing the necessary structural strength is obviously desirable. In achieving this end, it has been found that the convex shape of the top 32 of the cover together with the inclusion of integrally-formed reinforcing ribs 34, 36 and 38 contribute greatly to the strength of a construction utilizing relatively thin walls. The net effect of these reinforcing ribs irrespective of whether they are parallel to the rear edge of the cover as in the embodiment of FIGURES 1–5, inclusive, or normal thereto as in modification 10a, is to provide a corrugated convex structure having superior strength when compared with the plain version 10b of FIGURES 11 and 12 assuming the same wall thickness for each. In both ribbed covers 10 and 10a, each of the ribs comprises a recessed integrally moulded groove or channel 40 having a generally U-shaped cross-section.

Figure 4:
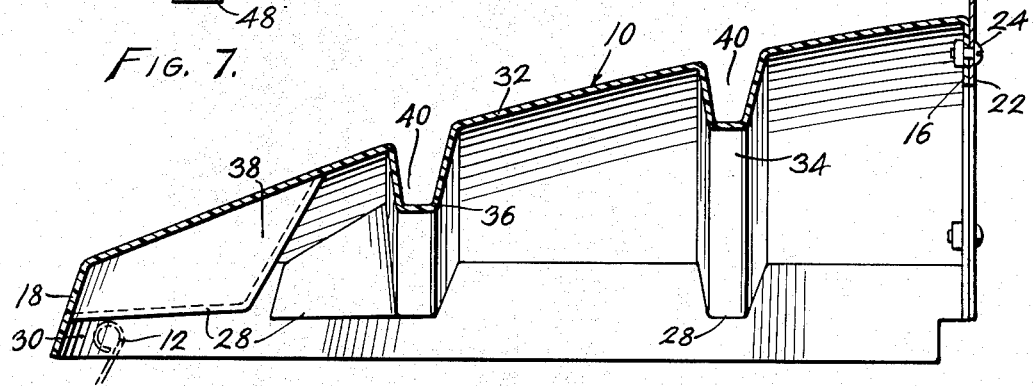
FIGURE 4 is a section taken along line 4—4 of FIGURE 1 but shown to an enlarged scale, portions of the shield having been broken away to conserve space.
Figure 5:
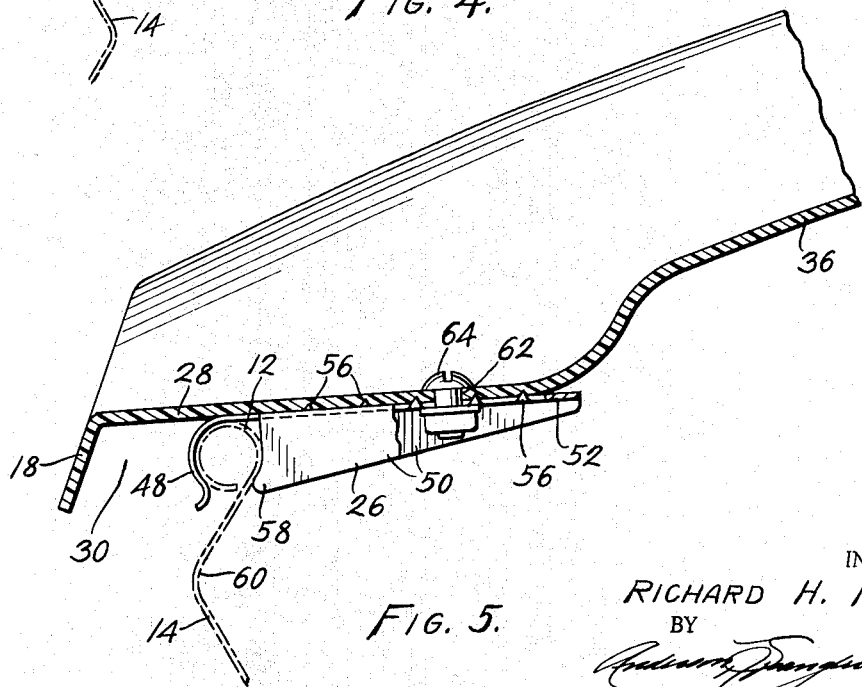
FIGURE 5 is a further enlarged fragmentary sectional detail taken along line 5—5 of FIGURE 1 revealing the spring-clip-type fastener construction.
Figure 9:
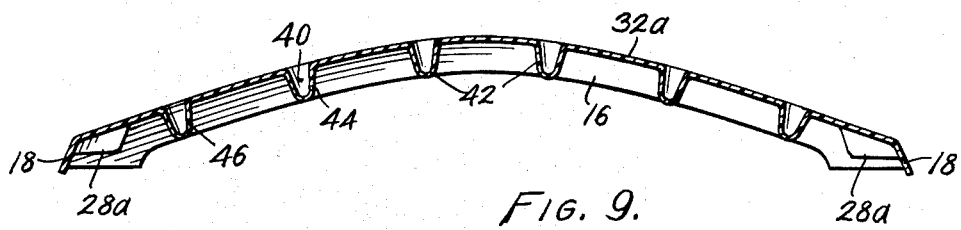
FIGURE 9 is a section taken along line 9—9 of FIGURE 8.
Figure 10:
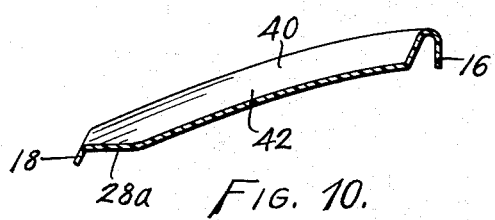
FIGURE 10 is a section taken along line 10—10 of FIGURE 8.

In the preferred embodiment of the cover illustrated in FIGURES 1–5 inclusive, rear rib 34 which is the longest extends parallel to the downturned flange 16 and is spaced forwardly therefrom approximately one-third the radial distance between the rear edge and front. This rib intersects the skirt 18 on both side of the cover and is of uniform depth except at its extremities where it is deepened slightly to form the essentially horizontal bottom wall of foot 28 that rests on the shell as shown in FIGURE 3. Intermediate rib 34 is positioned forwardly of rear rib 34 about the same distance therefrom as it was from flange 16. The integrally formed feet 28 at the extremities of the intermediate rib 36 are identical in all material respects to those provided on rear rib 34 except that they are preferably inclined relative to the direction in which rib 36 extends so as to lie essentially radially with respect to the center of the cover as seen in FIGURES 1, 4 and 5. The remaining rib 38 is located at the front center of the cover and extends radially normal to ribs 34 and 36 between the latter and skirt 18 as shown in FIGURES 1 and 4. Basically, front rib 38 is coextensive with step 28 the latter possessing the reinforcing properties of the other ribs. The feet 28, of which there are five altogether, support the cover at more or less equiangularly spaced points along its entire exposed periphery and they, in cooperation with the ribs, enable a relatively thin-walled structure to be made which will easily support the weight of a large man, i.e. two hundred pounds and more. The reason that the embodiment of FIGURES 1 through 5 is preferred to that of FIGURES 8, 9 and 10 is that the former requires fewer ribs and, therefore, less material than the latter to provide the same structural strength; otherwise, they are functional equivalents of one another. Obviously both embodiments 10 and 10a are preferred to embodiment 10b of FIGURES 10, 11 and 12 because the latter requires thicker walls in the absence of the ribs.

Before proceeding with a detailed description of the clip 26, it will be well to mention the differences between the three separate embodiments 10, 10a and 10b. Cover 10b as shown in FIGURES 8, 9 and 10 differs principally from embodiment 10 already described in that the ribs are normal to the straight rear edge rather than parallel thereto. Three pairs of ribs are required to provide approximately the same degree of structural stability and strength afforded by ribs 34, 36 and 38; these comprise an inner pair 42, and intermediate pair 44 and an outer pair 46. These ribs are all substantially parallel to one another and are spaced apart equally from corner to corner. Each of the ribs has only one foot 28a located at its outermost extremity adjacent the downturned skirt 18. All of the feet turn from the line of the rib associated therewith so as to extend substantially radially from the center of the cover. An additional foot is provided at each corner as shown in FIGURES 8 and 9 to support the cover in this area. These corner feet have not been included as serving the combined function of reinforcing ribs as was the case with rib 38 of the FIGURES 1–5 embodiment as the location of these feet abutting the exterior wall surface is such that they do not contribute materially to the reinforcement of the top 32a. Were they to be included there would, of course, be four rather than three pairs of reinforcing ribs.

It should also be mentioned that while cover 10a will work with only two spring clips located on the feet at the end of either ribs 44 or 46, four clips are preferably used with this embodiment resulting in a slight increase in cost over cover 10 which requires only two clips 26, yet, is securely fastened and entirely stable.

The plain cover 10b of FIGURES 11 and 12 differs from embodiments 10 and 10a in that it has no ribs nor does it have any integrally-formed steps although it could easily be fabricated to include the latter. Instead, top 32b is entirely plain and convex terminating in downturned flange 16 and skirt 18 as before; but, the steps 28b to which the clips 26 are fastened comprise wooden wedge-shaped blocks screwed or otherwise attached to the underside of top spaced inwardly from skirt 18 to leave air space 30 as before. Three such blocks are used, one at midcenter and one equiangularly spaced on both sides thereof. Here again, the blocks extend radially with respect to the center of the cover to accommodate the clips which are radially adjustable as will now be described.

Figure 6:
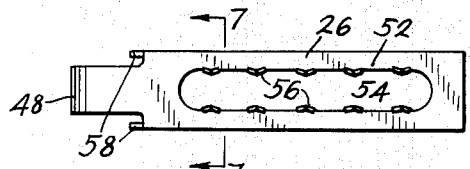
FIGURE 6 is a top plan view of the clip fastener by itself.
Figure 7:
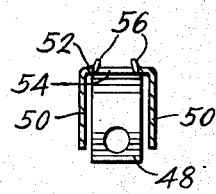
FIGURE 7 is a transverse section taken along line 7—7 of FIGURE 6.

Finally, attention is directed to FIGURES 5, 6 and 7 for a detailed description of the clip-type fastener 26 that is used to removably mount the cover on the edge of the shell. This fastener is stamped from flat spring steel stock to provide an elongate tongue-forming portion 48 projecting from one end, a pair of generally triangular flanges 50 bordering the body 52 on both sides thereof, an elongate slot 54 within the body extending in the direction of the length thereof, and a plurality of integrally formed upturned teeth 56 bordering the slot 54. The flanges 50 are turned downwardly into transversely spaced substantially parallel relation to define with the body portion a channel. The outer edge of each flange is provided with an integral ear 58 at its lower extremity which projects into the corrugation 60 of the shell adjacent the tubular upper edge thereof as shown most clearly in FIGURE 5. The tongue-forming portion 48 is curved downwardly and finally outwardly into the shape of a hook adapted to cooperate with the outer edge of the flanges 50 and associated ear to clip over and releasably grip the edge of the shell.

An aperture 62 is provided in the feet 28 of the cover 10 adapted to receive a fastener 64 which passes through the slot 54 in the clip and holds the latter in place. The slot, of course, allows the clip to be adjusted radially relative to the foot in order to accommodate shells of different sizes and shapes as well as those that have been bent or otherwise deformed. The upturned teeth 56 penetrate the plastic from which the cover is fabricated once the fastener 64 is turned up tight thereby locking the clip in adjusted position. Ordinarily, the tongue of the clip will be spaced inwardly from skirt 18 an inch or so to leave gap 30 for the circulation of air beneath the cover. The unribbed modification of FIGURES 11 and 12 uses the same clip, however, the fastener 62b is usually a wood screw turned into block 28b rather than the nut and bolt type of FIGURE 5.

Having thus described the several useful and novel features of the window well cover of the present invention, it will be seen that the many worthwhile objectives for which it was designed have been achieved. Although but a few specific embodiments of the invention have been illustrated in connection with the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A protective cover for generally semi-cylindrical window wells dug adjacent a building wall containing a subsurface window opening where the earthen walls of the pit are shored with a shell extending upwardly at least to ground level which comprises, an upwardly convex dome-like translucent plastic member of generally quarter-spherical shape sized to cover the pit, said member including an integrally formed downturned skirt bordering the curved forwardly extending edge thereof in position spaced outwardly from the corresponding edge of the shell to define an overhanging portion, at least three integrally-formed and downwardly-recessed pockets located in angularly-spaced relation along the arcuate periphery of the dome-like member providing supporting feet, spring clip-type fasteners mounted on the underside of each foot for radial adjustment into position to releasably clamp over the exposed edge of the shell, said underside of each foot being spaced above the free edge of the skirt so as to cooperate therewith in producing a marginal flange adapted to block the entry of foreign matter into the well, said fasteners lying in recessed relation behind the marginal flange which protects said fasteners from exposure to the weather, and said feet, said exposed edge of the shell and the inner surface of said dome-like member defining air passages permitting free circulation of air into the well when said dome-like member is clamped in place on the shell.

2. The window well cover as set forth in claim 1 in which a downturned flange depends from the rear edge of the dome-like member, said flange being adapted to engage the essentially planar exterior surface of the building wall bordering the window opening and form a substantially water-tight seal therewith when said dome-like member is clamped in place on the shell.

3. The window well cover as set forth in claim 1 in which the surface of the dome-like member contains a plurality of recessed reinforcing ribs extending from edge to edge thereof.

4. The window well cover as set forth in claim 1 in which the spring clips comprise a sheet of spring steel formed to provide an elongate body portion containing a longitudinal slot, an elongate tongue curving downwardly and outwardly from one end of the body portion to provide a hook-like element, and at least one downturned flange along one side of the body portion terminating in an edge spaced from the tongue to cooperate therewith in defining a channel adapted to receive the upper edge of the shell, said flange defining a rigid stop adapted to engage the inside of the shell and cooperate therewith to hold the dome-like member up tight against the building wall.

5. The window well cover as set forth in claim 4 in which the body portion of the clip is provided with upturned teeth bordering the elongate slot.

References Cited by the Examiner

UNITED STATES PATENTS

| | | | |
|---|---|---|---|
| 2,453,609 | 11/1948 | Whitehouse | 20—1 |
| 2,526,323 | 10/1950 | Blaski. | |
| 2,703,060 | 3/1955 | Kiefer | 50—116 |
| 2,863,177 | 12/1958 | Nelson et al. | 20—1 |
| 3,002,236 | 10/1961 | Humphner | 20—40 |
| 3,048,897 | 8/1962 | Slade | 20—1 |

FRANK L. ABBOTT, *Primary Examiner.*

JOEL REZNEK, JACOB L. NACKENOFF, RICHARD W. COOKE, JR., *Examiners.*